United States Patent
Trivedi et al.

(10) Patent No.: US 11,614,987 B2
(45) Date of Patent: Mar. 28, 2023

(54) VERIFYING DATA LOADING REQUIREMENTS OF AN AVIONICS UNIT

(71) Applicant: HCL TECHNOLOGIES LIMITED, Uttar Pradesh (IN)

(72) Inventors: Jignesh Jagdishbhai Trivedi, Bengaluru (IN); Sourav Dey, Bengaluru (IN)

(73) Assignee: HCL TECHNOLOGIES LIMITED, Noida (IN)

( * ) Notice: Subject to any disclaimer, the term of this patent is extended or adjusted under 35 U.S.C. 154(b) by 296 days.

(21) Appl. No.: 16/828,086

(22) Filed: Mar. 24, 2020

(65) Prior Publication Data

US 2020/0310903 A1 Oct. 1, 2020

(30) Foreign Application Priority Data

Mar. 26, 2019 (IN) .............................. 201911011786

(51) Int. Cl.
| | | |
|---|---|---|
| *G06F 11/07* | (2006.01) | |
| *G01C 23/00* | (2006.01) | |
| *G06F 11/30* | (2006.01) | |
| G06F 16/16 | (2019.01) | |
| G06F 9/445 | (2018.01) | |

(52) U.S. Cl.
CPC ........ *G06F 11/0739* (2013.01); *G01C 23/005* (2013.01); *G06F 11/3013* (2013.01); *G06F 9/445* (2013.01); *G06F 16/164* (2019.01)

(58) Field of Classification Search
CPC ...... G06F 11/0739; G06F 11/14; G06F 11/33; G06F 11/3013; G06F 9/445; G06F 16/164
See application file for complete search history.

(56) References Cited

U.S. PATENT DOCUMENTS

| | | |
|---|---|---|
| 4,943,919 A | 7/1990 | Aslin et al. |
| 6,894,611 B2 | 5/2005 | Butz et al. |
| 8,335,601 B2 | 12/2012 | Sham et al. |
| 8,442,751 B2 | 5/2013 | Kimberly et al. |
| 2003/0003872 A1 | 1/2003 | Brinkley et al. |
| 2004/0106404 A1* | 6/2004 | Gould .............. G06F 8/60 455/431 |

(Continued)

FOREIGN PATENT DOCUMENTS

WO WO-2008004221 A2 * 1/2008 ........... G06F 17/248

OTHER PUBLICATIONS

Data Loader for Complex Testing of On-Board Systems by David Hrbek Brno University of Technology, 2018 https://www.vut.cz/www_base/zav_prace_soubor_verejne.php?file_id=181853 (Year: 2018).*

*Primary Examiner* — Joseph O Schell

(57) ABSTRACT

The present disclosure relates to system(s) and method(s) for verifying data loading requirements of an avionics unit. The system receives a request for data loading. The request comprises file data, and data loading requirements associated with the avionics unit. Further, the system obtains target file from a repository based on an analysis of the request. The system further generates valid data set and invalid data set in the target file based on an analysis of the data loading requirements. Upon generation, the system verifies predefined data loading requirements of the avionics unit using the invalid data set from the target file.

10 Claims, 3 Drawing Sheets

(56) References Cited

U.S. PATENT DOCUMENTS

| | | | | |
|---|---|---|---|---|
| 2006/0047966 A1* | 3/2006 | Iwamura | ............... | H04L 9/14 |
| | | | | 713/176 |
| 2007/0149168 A1* | 6/2007 | Hariki | ............... | H04L 12/1471 |
| | | | | 455/405 |
| 2008/0307232 A1* | 12/2008 | Pasquinelli | ............ | G06F 21/64 |
| | | | | 713/178 |
| 2009/0133125 A1* | 5/2009 | Choi | ............... | G06F 21/562 |
| | | | | 726/24 |
| 2009/0138871 A1* | 5/2009 | Kimberly | ............ | H04W 76/10 |
| | | | | 717/173 |
| 2013/0247025 A1* | 9/2013 | Barberet | ............ | G06F 8/61 |
| | | | | 717/173 |
| 2017/0242680 A1* | 8/2017 | Angus | ............... | G06F 9/526 |

* cited by examiner

VERIFYING DATA LOADING REQUIREMENTS OF AN AVIONICS UNIT

CROSS-REFERENCE TO RELATED APPLICATIONS AND PRIORITY

The present application claims benefit from Indian Complete Patent Application No. 201911011786 filed on 26 Mar. 2019 the entirety of which is hereby incorporated by reference.

TECHNICAL FIELD

The present disclosure in general relates to the field of an avionics unit. More particularly, the present invention relates to a system and method for verifying data loading requirements of an avionics unit.

BACKGROUND

ARINC 665 standard is applicable to all Loadable Software Parts (LSP) and software transport media intended for use in aircraft programs, systems, equipment, and Line Replaceable Units (LRUs). It is to be noted that this standard defines an aircraft industry's standards for a Loadable Software Parts (LSPs) and a Media Set Parts (MSPs). It describes the common principles and rules to be applied to any part of a data load system to ensure compatibility and interoperability. It includes part numbering, content, labelling, and formatting of an LSP, and a Media Set containing LSPs. At times, an error may occur during loading data in the data load system. It becomes difficult to identify the error and restrict corruption of data in the data load system.

SUMMARY

Before the present systems and methods for verifying data loading requirements of an avionics unit, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for verifying data loading requirements of the avionics unit. This summary is not intended to identify essential features of the claimed subject matter nor is it intended for use in determining or limiting the scope of the claimed subject matter.

In one implementation, a method for verifying data loading requirements of an avionics unit. In one embodiment, the method may comprise receiving a request for data loading. The request may comprise file data, and data loading requirements associated with an avionics unit. Further, the method may comprise obtaining target file from a repository based on an analysis of the request. Furthermore, the method may comprise generating, by the processor, valid data set and invalid data set in the target file based on an analysis of the data loading requirements. The method may further comprise verifying predefined data loading requirements associated with the avionics unit using the invalid data set from the target file.

In another implementation, a system for verifying data loading requirements of an avionics unit is illustrated. The system comprises a memory and a processor coupled to the memory, further the processor is configured to execute instructions stored in the memory. In one embodiment, the processor may execute instructions stored in the memory for receiving a request for data loading. The request may comprise file data, and data loading requirements associated with an avionics unit. Further, the processor may execute instructions stored in the memory for obtaining target file from a repository based on an analysis of the request. Furthermore, the processor may execute instructions stored in the memory for generating, by the processor, valid data set and invalid data set in the target file based on an analysis of the data loading requirements. The processor may further execute instructions stored in the memory for verifying predefined data loading requirements associated with the avionics unit using the invalid data set from the target file.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "receiving", "obtaining", "generating", "verifying", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for verifying data loading requirements of an avionics unit are now described. The disclosed embodiments of the system and method for verifying data loading requirements of the avionics unit are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for verifying data loading requirements of an avionics unit is not intended to be limited to the embodiments illustrated, but is to be accorded the widest scope consistent with the principles and features described herein.

The present subject matter relates to verifying data loading requirements of an avionics unit. In one embodiment, a request for data loading may be received. The request may comprise file data, and data loading requirements associated with the avionics unit. Once the request is received, target file may be obtained from a repository based on an analysis of the request. Upon obtaining the target file, valid data set and invalid data set may be generated in the target file. The invalid data set and the valid data set may be generated based on an analysis of the data loading requirements. Further, predefined data loading requirements associated with the avionics unit may be verified based on the invalid data set.

Figure 1:
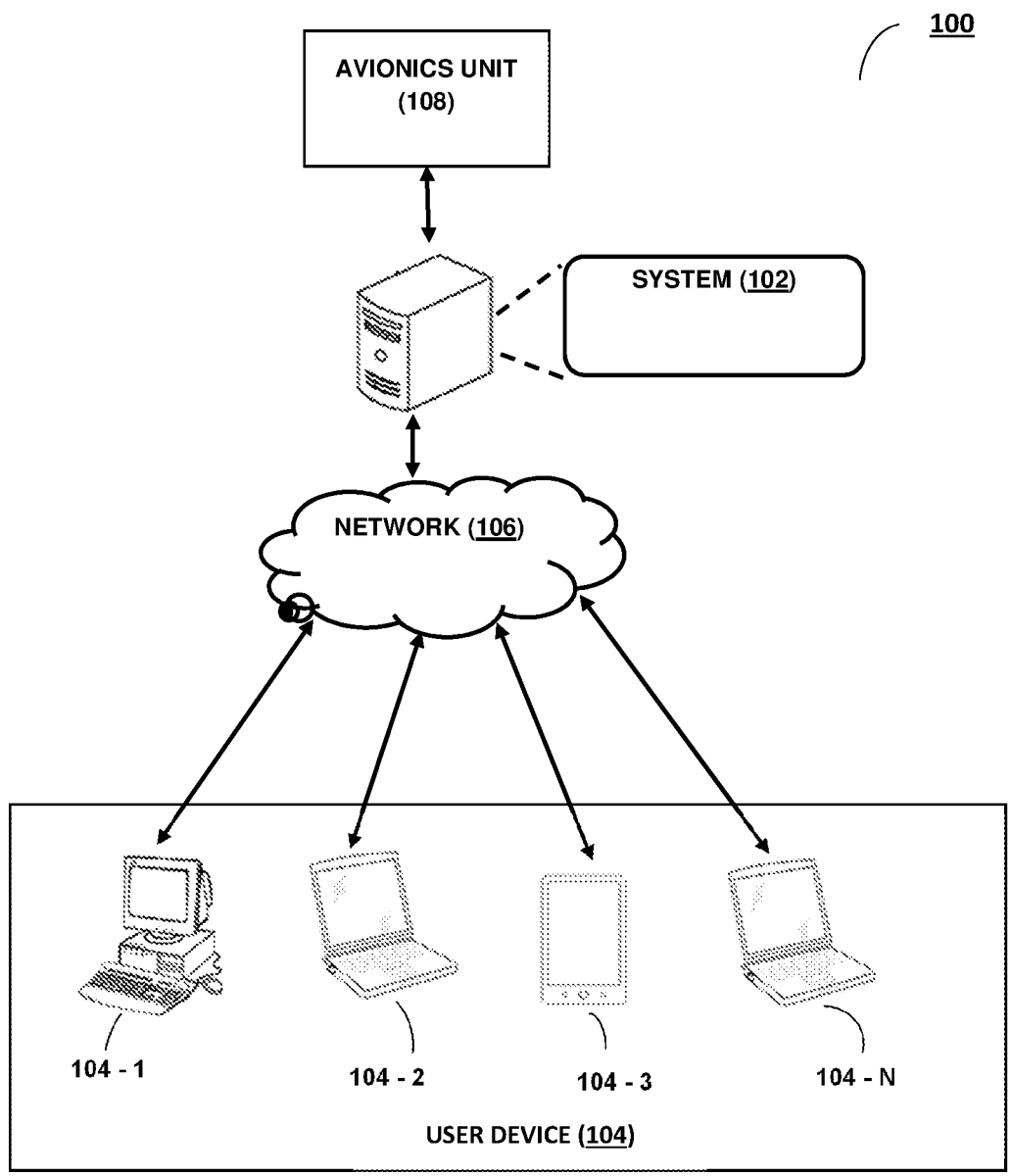
FIG. 1 illustrates a network implementation of a system for verifying data loading requirements of an avionics unit, in accordance with an embodiment of the present subject matter.

Referring now to FIG. 1, a network implementation 100 of a system 102 for verifying data loading requirements is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be connected to an avionics unit 108. In another embodiment, the system 102 may be implemented in the avionics unit 108. The avionics unit 108 may be data load software such as a Line Replaceable Unit (LRUs). The data load software may reside in a target hardware.

In one embodiment, the system 102 may receive a request for data loading. The request may be received from the avionics unit 108. The request may be received based on inputs provided by a user. The request may comprise file data, data loading requirements associated with the avionics unit 108, and the like. The file data may comprise a file name, a file location, a file size and the like.

Once the request is received, the system 102 may obtain target file from a repository. The target file may be obtained based on an analysis of the request. In one aspect, the system 102 may analyse the file data.

Further, the system 102 may generate valid data set and invalid data set in the target file. The valid data set and the invalid data set may be generated based on an analysis of the data loading requirements. The valid data set and the invalid data set may be one of Loadable Software Parts (LSPs) or media sets. The invalid data set may be generated in predefined fields of the target file. In one aspect, the invalid data set may be generated in a header of the target file. The invalid data set may be generated based on use inputs associated with the data loading requirements.

Upon generation, the system 102 may verify predefined data load requirements of the avionics unit. The predefined data load requirements may be verified using the invalid data set in the target file. Based on the verification, the system 102 may check whether the data load requirements are satisfied. If the data load requirements are satisfied, the system 102 may load the valid data set in the avionics unit. If the data load requirements are not satisfied, the system 102 may discard loading of the valid data set. The loading of the valid data set may be referred to as uploading the valid data set in the avionics unit.

In another embodiment, the system 102 may be referred to as ARINC 665 Media Set Creator tool. The tool may create Media Set files such as .LUH, FILES.LUM, LOADS.LUM, and number of data files and support files. Further, the tool may create invalid Media Set as well as creates all Media Set with all possible combination of specific field in Media Set which will be used to verify many functionalities/requirements of the data load software. The generated Media Set is the only input for the ARINC 615 or ARINC 615-A complaint data loader tool that sends the generated Media Set to a target hardware.

It is to be noted that the data load software residing in the target hardware may first check the "Header File CRC" before parsing/processing the Header File. Hence data loading operation may abort due to different reason than stated in requirement. The tool may address this issue and only corrupts the specific field while all other are valid. In one embodiment, the tool may act as ARINC 665 complaint when it creates valid Media Set else act as ARINC 665 Non-complaint when it creates invalid Media Set.

Figure 2:
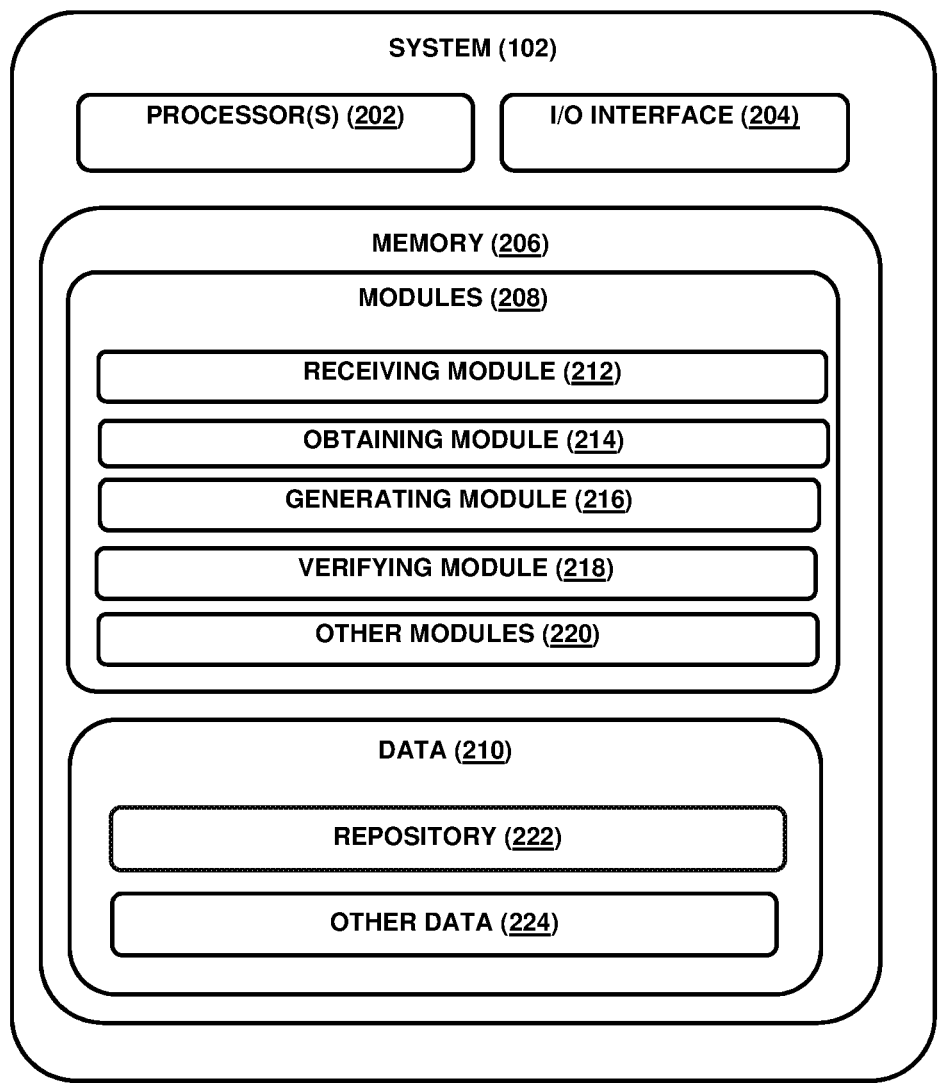
FIG. 2 illustrates the system for verifying data loading requirements of the avionics unit, in accordance with an embodiment of the present subject matter.

Referring now to FIG. 2, the system 102 for verifying data loading requirements of an avionics unit is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a receiving module 212, an obtaining module 214, a generating module 216, a verifying module 218, and other modules 220. The other modules 220 may include programs or coded instructions that supplement applications and functions of the system 102.

The data 210, amongst other things, serve as a repository for storing data processed, received, and generated by one or more of the modules 208. The data 210 may also include a repository 222, and other data 224. In one embodiment, the other data 224 may include data generated as a result of the execution of one or more modules in the other modules 220.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the receiving module 212 may receive a request for data loading. The request may be received from the avionics unit 108. The request may be received based on inputs from the user. The request may comprise file data, and data loading requirements associated with the avionics unit 108. The file data may comprise a file name, a file size, a file location and the like.

In one example, the data loading requirement may correspond to aborting data loading operation and sending the final "Load Uploading Status" (.LUS) file as mentioned if the value in 'Header File Length' field in received Header File doesn't match the actual length as the number of 16-bit words of the Header File. In one aspect, the data loading requirements may be in .LUS file, 'Upload Operation Status Code' field set to 0x1003. Further, in .LUS file, 'Upload Status Description' field set to <Invalid Header File Length>.

Once the request is received, the obtaining module 214 may obtain a target file from a repository. The target file may be received based on an analysis of the request. In one aspect, the obtaining module 214 may analyse the file data received in the request. Based on the analysis, the obtaining module 214 may fetch the target file. The target file may comprise data set that is to be uploaded in the avionics unit 108.

Upon obtaining the target file, the generating module 216 may generate valid data set and invalid data set. The valid data set and the invalid data set may be generated in the target file. The valid data set and the invalid data set may be generated based on an analysis of the data loading requirements. The valid data set and the invalid data set may be one of Loadable Software Parts (LSPs), media sets and the like. The valid data set may indicate valid data that is to be uploaded in the avionics unit 108. The invalid data set may indicate an error.

In one embodiment, the invalid data set may be generated based on user inputs associated with the data loading requirements. In one aspect, the invalid data set may be generated in a header of the target file. In other words, the invalid data set may be the error added in the target file. The invalid data set may be further used to identify the error at the time of uploading the target file.

Further, the verifying module 218 may verify predefined data loading requirements of the avionics unit 108. The predefined data loading requirements may be verified using the invalid data set. Based on the verification, the verifying module 218 may check if the predefined data loading requirements are satisfied or not.

In one embodiment, the verifying module 218 may upload the valid data in the avionics unit 108, when the predefined data loading requirements are verified. In another embodiment, the verifying module 218 may discard the uploading of the valid data, when the predefined data loading requirements are verified. In other words, the invalid data may be used to verify the predefined data loading requirements. Further, the valid data may be loaded to the avionics unit 108 based on the verification.

In one exemplary embodiment, construe a data loading requirement to create Media Set with all possible combination of specific field. The data loading requirement may start as a data load software residing in a target hardware shall abort the data loading operation and sends the final "Load Uploading Status" (.LUS) file as mentioned below if the value in 'Load PN Length' field in received Header File is greater than 15 characters. In .LUS file, 'Upload Operation Status Code' field set to 0x1003. In .LUS file, 'Upload Status Description' field set to <Invalid Load PN Length>.

Further, in order to test the above requirement, the ARINC 665 Media Set Creator tool creates following Media Set (Note: Load PN Length is of type unsigned short):

In generated Media Set header file, The "Load PN Length" field value set to 0 (characters). In generated Media Set header file, The "Load PN Length" field value set to 1 (characters). In generated Media Set header file, The "Load PN Length" field value set to 14 (characters). In generated Media Set header file, The "Load PN Length" field value set to 15 (characters). In generated Media Set header file, The "Load PN Length" field value set to 16 (characters). In generated Media Set header file, The "Load PN Length" field value set to 65535 (characters).

The above Media Set may effectively test the data loading requirement which covers the normal and robustness/abnormal scenario. These may not be possible by using other standard Media Set Creator tool available in the market due to A665 recommendation. In one example, the A665-3 recommends that the format for Loadable Software PNs should be MMMCC-SSSS-SSSS hence other tool may not create tool outside it's A665 recommendation but outside A665 recommendation range is required to effectively carry out the data load software testing.

Exemplary embodiments discussed above may provide certain advantages. Though not required to practice aspects of the disclosure, these advantages may include those provided by the following features.

Some embodiments of the system and the method is configured to verify data loading requirements of data load software.

Some embodiments of the system and the method is configured to create invalid media set to verify data loading requirements.

Some embodiments of the system and the method is configured to provide a command line application which can be used to build Media Set Parts (MSPs) and Loadable Software Parts (LSPs). The command line may be integrated into software build tools and scripts to make the generation of loadable ARINC 665 software parts part of the avionics software build processes.

Figure 3:
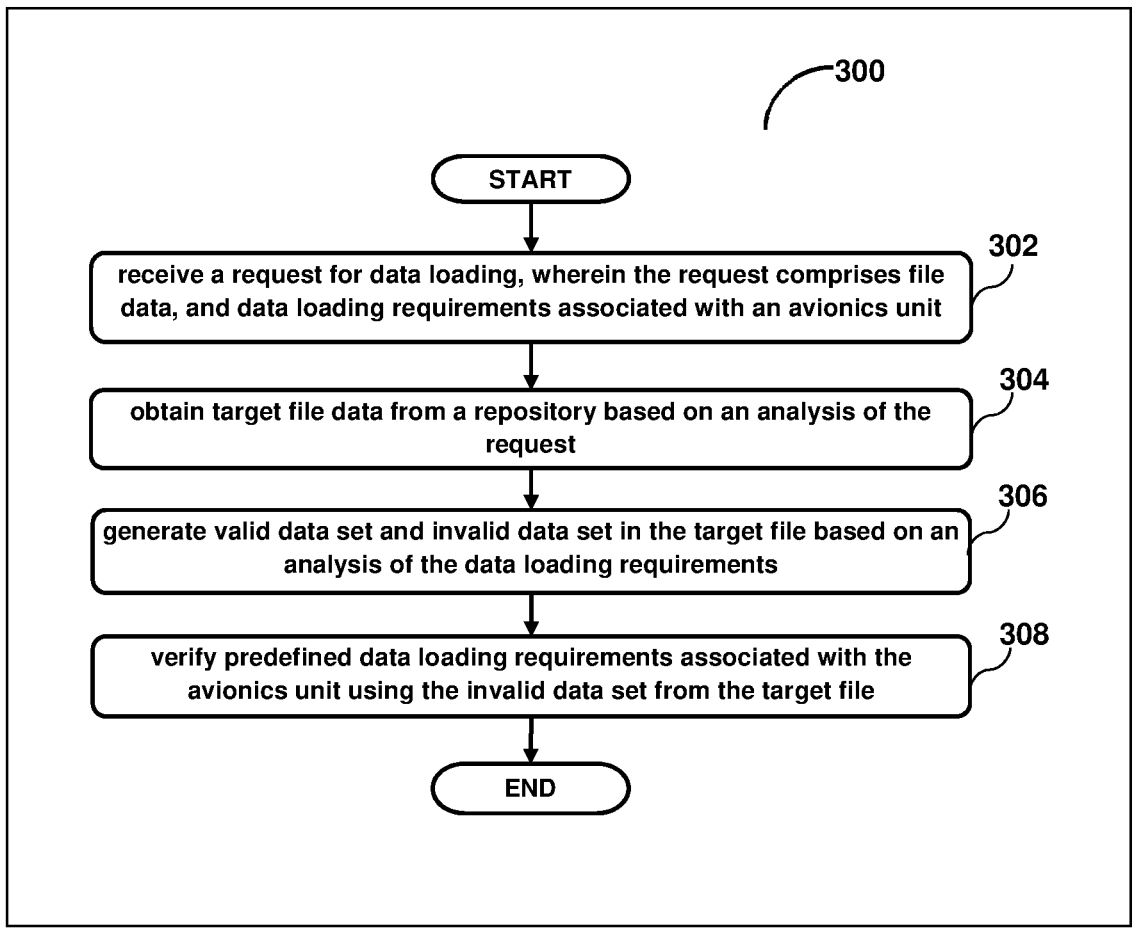
FIG. 3 illustrates a method for verifying data loading requirements of an avionics unit, in accordance with an embodiment of the present subject matter.

Referring now to FIG. 3, a method 300 for verifying data loading requirements of a n avionics unit, is disclosed in accordance with an embodiment of the present subject matter. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method 300 can be implemented in any suitable hardware, software, firmware, or combination thereof. However, for ease of explanation, in the embodiments described below, the method may be considered to be implemented in the above described system 102.

At block 302, a request for data loading may be received. In one implementation, the receiving module 212 may receive the request. The request may comprise file data, and data loading requirements associated with the avionics unit 108.

At block 304, a target file may be obtained. In one implementation, the obtaining module 314 may obtain the target file from a repository. The target file may be obtained based on an analysis of the request.

At block 306, valid data set and invalid data set may be generated. In one implementation, the generating module 216 may generate the valid data set and the invalid data set in the target file. The valid data set and the invalid data set may be generated based on an analysis of the data loading requirements.

At block 308, predefined data loading requirements of the avionics unit 108 may be verified. In one implementation, the verifying module 218 may verify the predefined data loading requirements using the invalid data set. Based on the verification, the valid data set may be loaded in the avionics unit 108. In one embodiment, the valid data set may be loaded in the avionics unit 108, when the predefined data loading requirements are satisfied. In another embodiment, the valid data may not be loaded in the avionics unit 108, when the predefined data loading requirements are not satisfied.

Although implementations for systems and methods for verifying data loading requirements of an avionics unit have been described, it is to be understood that the appended claims are not necessarily limited to the specific features or methods described. Rather, the specific features and methods are disclosed as examples of implementations for verifying data loading requirements of the avionics unit.

The invention claimed is:

1. A method for verifying data loading requirements of an avionics unit, the method comprises:
   receiving, by a processor, a request for data loading, wherein the request comprises file data, and data loading requirements associated with an avionics unit;
   obtaining, by the processor, target file from a repository based on an analysis of the request;
   generating, by the processor, valid data set and invalid data set in the target file based on an analysis of the data loading requirements,
      wherein the valid data set is indicative of data to be uploaded in the avionics unit and the invalid data set is indicative of an error that is identified on uploading of the target file,
      wherein the target file comprises predefined fields that are used to create a media set with a plurality of combinations of two or more of the predefined fields of the target file, and wherein the invalid data set is generated in the predefined fields of the target file; and
   verifying, by the processor, predefined data loading requirements associated with the avionics unit using the invalid data set generated in predefined fields of the target file.

2. The method as claimed in claim 1, further comprises loading the valid data set in the avionics unit when the predefined data loading requirements are satisfied.

3. The method as claimed in claim 1, further comprises cancelling the loading of the valid data set in the avionics unit when the predefined data loading requirements are not satisfied.

4. The method as claimed in claim 1, wherein the valid data set and the invalid data set is one of Loadable Software Parts (LSPs) or media sets.

5. The method as claimed in claim 1, wherein the invalid data set is generated based on user inputs associated with the data loading requirements.

6. A system for verifying data loading requirements of an avionics unit, the system comprising:
   a memory;
   a processor coupled to the memory, wherein the processor is configured to execute instructions stored in the memory to:
      receive a request for data loading, wherein the request comprises file data, and data loading requirements associated with an avionics unit;
      obtain target file from a repository based on an analysis of the request;
      generate valid data set and invalid data set in the target file based on an analysis of the data loading requirements,
         wherein the valid data set is indicative of data to be uploaded in the avionics unit and the invalid data set is indicative of an error that is identified on uploading of the target file,
         wherein the target file comprises predefined fields that are used to create a media set with a plurality of combinations of two or more of the predefined fields of the target file, and wherein the invalid data set is generated in the predefined fields of the target file; and
      verify predefined data loading requirements associated with the avionics unit using the invalid data set generated in predefined fields of the target file.

7. The system as claimed in claim 6, further configured to load the valid data set in the avionics unit when the predefined data loading requirements are satisfied.

8. The system as claimed in claim 6, further configured to cancel the loading of the valid data set in the avionics unit when the predefined data loading requirements are not satisfied.

9. The system as claimed in claim 6, wherein the valid data set and the invalid data set is one of Loadable Software Parts (LSPs) or media sets.

10. The system as claimed in claim 6, wherein the invalid data set is generated based on user inputs associated with the data loading requirements.

\* \* \* \* \*